United States Patent [19]

Miller

[11] 4,327,049

[45] Apr. 27, 1982

[54] METHOD OF FORMING AUTOMOTIVE HEADLINERS FROM COMPOSITE FOAMED RESIN BLANKS

[76] Inventor: Frederick O. Miller, 1267 Passolt St., Saginaw, Mich. 48603

[21] Appl. No.: 121,294

[22] Filed: Feb. 14, 1980

[51] Int. Cl.³ .................... B29C 17/10; B29D 27/00
[52] U.S. Cl. ................................. 264/138; 264/163; 264/257; 264/321; 425/298; 428/305; 428/315; 428/246; 428/316.6
[58] Field of Search .............. 264/321, 257, 138, 163; 428/315, 305; 425/298

[56] References Cited

U.S. PATENT DOCUMENTS

| | | | |
|---|---|---|---|
| 2,702,769 | 2/1955 | Alderfer | 264/321 X |
| 2,946,713 | 7/1960 | Dusina et al. | 264/321 X |
| 3,164,655 | 1/1965 | Howard et al. | 264/321 |
| 3,234,065 | 2/1966 | Best | 264/321 X |
| 3,400,040 | 9/1968 | Osgood | 264/321 X |
| 3,406,234 | 10/1968 | Bailly | 264/321 X |
| 3,471,354 | 10/1969 | Scofield | 264/321 X |
| 3,556,918 | 1/1971 | Lemelson | 264/321 X |
| 3,684,633 | 8/1972 | Haase | 428/315 X |
| 3,822,161 | 7/1974 | Haase | 264/321 X |

FOREIGN PATENT DOCUMENTS 48-28786 9/1973 Japan .................... 264/321

*Primary Examiner*—Philip Anderson
*Attorney, Agent, or Firm*—Learman & McCulloch

[57] ABSTRACT

An automotive vehicle headliner is formed from a flat strip having laminated layers of resilient, cellular, foamed plastic and a finish textile material. The strip is cut to form a flat blank which is heated to a temperature at which the foamed plastic loses its resilience. While in its heated state the blank is compressively deformed and simultaneously trimmed in a mold to the desired size and contour and the cells adjacent the marginal edge of the blank are reduced in size to reduce the wall thickness of the blank. The deformed and trimmed blank is cooled while the compressive air force is maintained.

8 Claims, 7 Drawing Figures

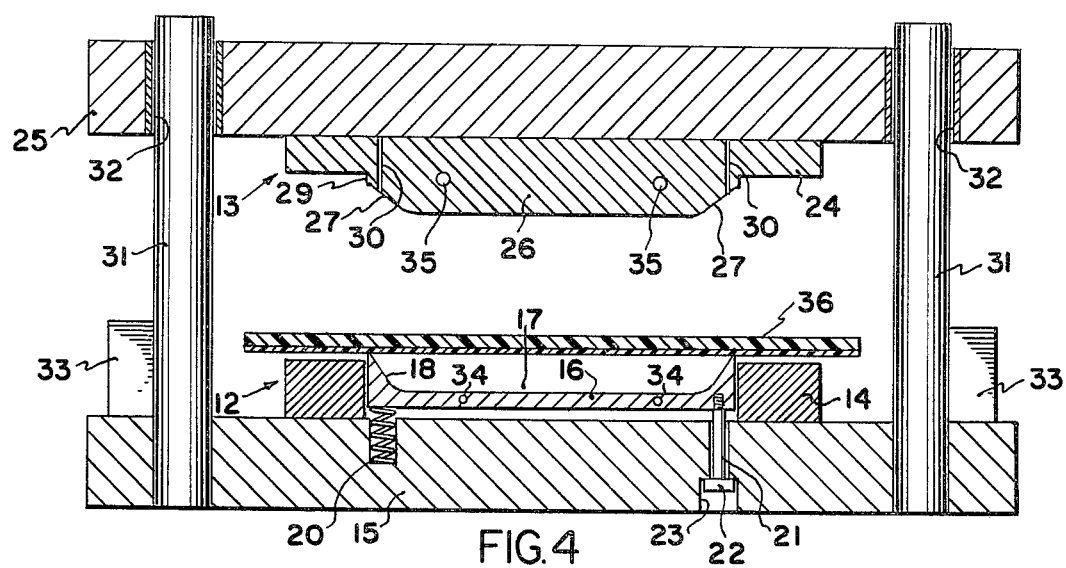
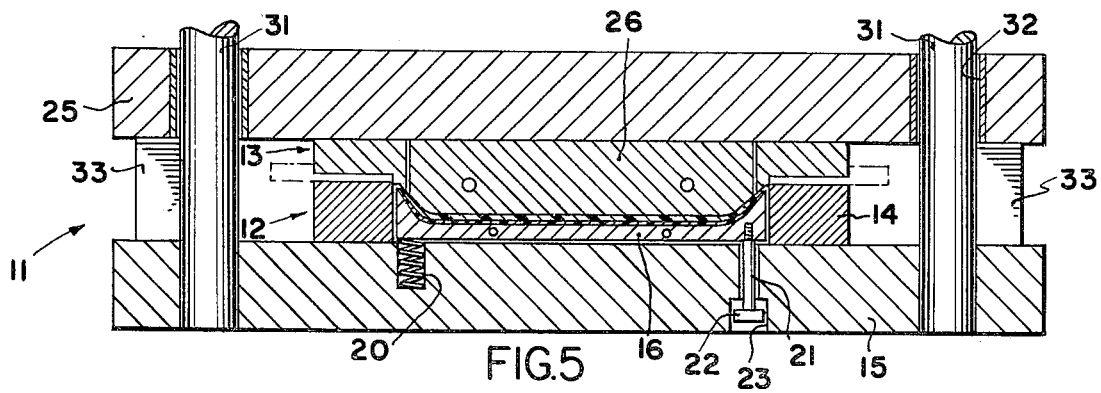

METHOD OF FORMING AUTOMOTIVE HEADLINERS FROM COMPOSITE FOAMED RESIN BLANKS

BACKGROUND OF THE INVENTION

It is common practice at the present time to manufacture automotive headliners from multi-layered laminates including one or more layers of thermoplastic materials and a finish layer of fabric or fabric-like textile material. Examples of such headliners, and the processes of producing them, are illustrated in U.S. Pat. Nos. 3,252,732; 3,265,530; 3,620,906; 4,020,207; 4,042,751; 4,119,749; and 4,131,702. Some of these prior constructions are formed as panels from laminated sheets which are cut and then formed or shaped, whereas others are formed by various kinds of molding techniques. In all instances, however, various trimming operations appear to be necessary following the formation of the panels that ultimately are to become headliners.

Another disadvantage of processes used heretofore in the production of automotive headliners is that, in many instances, the edges of the liners are of such thickness that special trim strips or moldings are necessary to secure the edges of the liners and to avoid exposure of the edges when the liners are fitted to automotive vehicles.

SUMMARY OF THE INVENTION

An article formed according to the invention utilizes a blank composed of laminated layers of material. The blank initially is of substantially uniform thickness and comprises a form stable, relatively stiff or dense backing layer of foamed, cellular thermoplastic material, an intermediate layer of relatively soft, or less dense foamed cellular material and a thin layer of synthetic textile material. The blank is sheared from an elongate strip or sheet and subsequently heated to a temperature at which the backing and intermediate layers become plastic or tacky and lose their resilience. The heated blank is placed between relatively movable mold halves having complementary, confronting mold surfaces defining a cavity which is configured to impart to the blank the desired contour.

While in a heated state, the blank is subjected to compressive force between the relatively movable mold halves. The size of the cavity diminishes in a direction toward the periphery of the mold, thereby enabling the confronting surfaces of the mold halves adjacent the marginal edges of the blank to compress the blank and collapse or reduce the size of the cells of the backing and intermediate layers. As the mold halves move toward one another to apply the compressive force, cutting edges provided on the mold halves react with one another to cut the blank to the exact size of the headliner to be produced, following which the mold halves move to their fully closed positions.

While maintaining the mold halves in their fully closed positions, cooling fluid is circulated through the mold halves to conduct heat from the blank and cool the latter. Following cooling of the blank, the mold halves are moved away from one another to enable the finished liner to be removed from the mold.

A liner produced in accordance with the invention has the desired contour and marginal edges which taper to thin, cleanly cut edges. The contouring, trimming, and tapering of the blank are formed in a single operation.

DESCRIPTION OF THE DRAWINGS

Apparatus for use in forming a molded headliner, and the headliner, are illustrated in the accompanying drawings in which:

FIG. 4 is a view similar to FIG. 3, but illustrating the mold halves in separated position and with a blank therebetween;

FIG. 5 is a view similar to FIG. 4, but illustrating the mold halves in closed position;

FIG. 6 is a fragmentary, greatly enlarged sectional view of a portion of the structure shown in FIG. 5; and FIG. 7 is a fragmentary, greatly enlarged sectional view of one side of a finished headliner.

DETAILED DESCRIPTION

Figure 1:
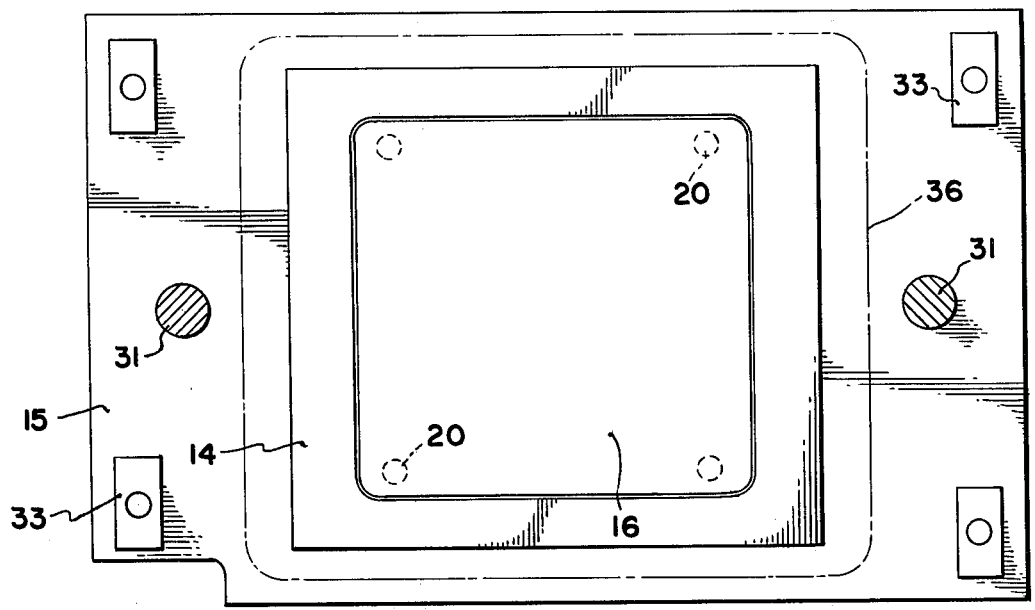
FIG. 1 is a top plan view of one mold half of a two-part mold.
Figure 2:
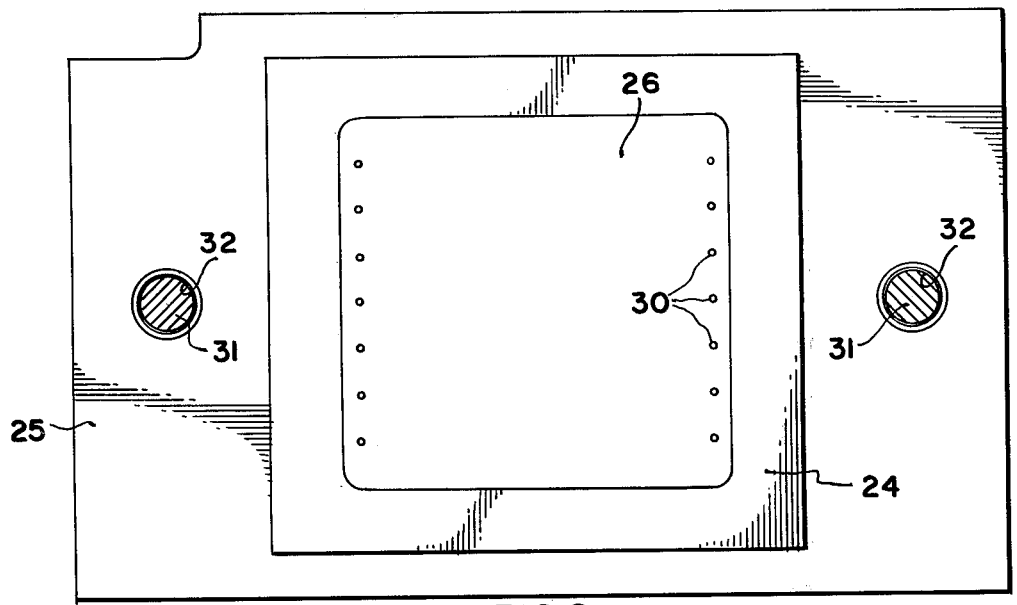
FIG. 2 is a bottom plan view of the other half of the mold.
Figure 3:
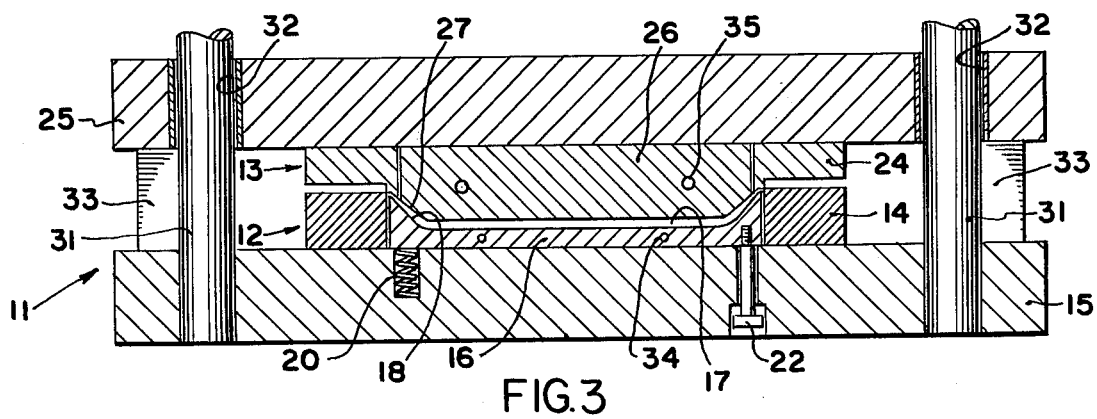
FIG. 3 is a transverse sectional view illustrating the two mold halves in overlying relation.

The objective of the invention is to produce a molded article, such as an automotive headliner, designated generally by the reference character 1 in FIG. 7. In a preferred embodiment the headliner comprises a multilayer laminate having a form stable relatively stiff backing member 2 formed of cellular, thermoplastic material, such as foamed polystyrene; an intermediate relatively soft layer 3 formed of cellular, foamed thermoplastic material such as polyurethane; and a finish layer 4 formed of thin textile material such as nylon. The layer 2 has a crown portion 5 of substantially uniform thickness from which extends a marginal, upstanding sidewall 6 that terminates in an outwardly turned lip 7. The thickness of the sidewall 6 varies over its length so as to taper outwardly from the crown portion 5, and the taper preferably is linear over the width of the side and lip. The layer 3 has a corresponding crown portion 8 of substantially uniform thickness, a corresponding sidewall 9, and a corresponding lip 10, and again the portions 9 and 10 taper substantially linearly toward the marginal edge.

Apparatus for producing the article 1 comprises a mold 11 composed of a first or lower half 12 and a second or upper half 13. The lower half comprises a rectangular frame 14 secured in any suitable manner to a base 15. Fitted within the frame 14 is a die 16 having a cavity 17 configured to correspond to the contour of the article to be formed. For ease of illustration the base of the cavity is disclosed as being flat and horizontal, but it will be understood that this surface could be contoured differently.

The cavity 17 has at its outer region an upstanding, outwardly inclined side surface 18. At its upper end the surface 18 merges with a flat, horizontal surface or rim 19.

The die 16 is vertically reciprocable relative to the base 15 and normally is maintained in an elevated position relative thereto by a plurality of compression springs, one of which is shown at 20. Upward movement of the die 16 is limited by bolts 21 threaded into openings in the base of the die and having enlarged heads 22 slidably accommodated in a counterbore 23 formed in the base 15. When the die is in its elevated position, the flat surfaces 19 project above the level of the frame members 14. However, the member 16 is capable of downward movement a distance sufficient to locate the peripheral surfaces 19 at level lower than that of the frame members 14, as is shown in FIG. 6.

The upper mold half 13 has a peripheral flange 24 which is bolted or otherwise suitably fixed to a platen 25 that is movable vertically toward and away from the base 13 by conventional power means (not shown). The mold member 13 has a convex die 26 having a bottom surface which complements the cavity 17 and merges with side surfaces 27 that converge downwardly along lines inclined to a vertical plane of reference. Each surface 27 terminates in a step 28 which, in turn, terminates in a smooth, vertical shearing edge 29 which is adapted to be accommodated snugly within the frame members 14 of the lower mold half.

The inclination of the side surfaces 27 is different from that of the side surfaces 18 of the lower mold half. The angle of inclination of the surfaces 27 to the vertical plane is greater than that of the surfaces 18 for a purpose presently to be explained.

The die 26 has a number of small bore vent openings 30, as is customary, to permit air to escape from the cavity 17. Similar vents (not shown) may be provided in the die 16.

The platen 25 is guided in its movements by guide pins 31 fixed to the bed 15 and extending through bushing-lined openings 32 in the platen. Movement of the platen 25 toward the bed 15 is limited by stop blocks 33 fixed to the bed 15 and projecting upwardly therefrom.

The die members 16 and 26 are provided with a plurality of passages 34 and 35, respectively, connected by suitable tubing (not shown) in a conventional manner to a source of coolant fluid, such as water, which may be circulated through the passages for cooling the dies and an article therebetween.

OPERATION

The disclosed apparatus is adapted for use in connection with flat blanks 36 of multi-layered materials such as those referred to earlier. The blanks are cut from elongate, flat laminated strips of substantially uniform thickness and so arranged that the backing layer 2 is lowermost, the finish textile layer 4 is uppermost, and the intermediate layer 3 is sandwiched therebetween.

The strips from which the blanks 36 are cut may be produced in any one of a number of known ways and may be cut into blanks by any suitable transverse cutting apparatus.

Prior to introduction between the separated mold halves 12 and 13, a blank is heated by any one of a number of known heating devices. The temperature to which the blank is heated should be sufficient to cause the materials forming the layers 2 and 3 to lose their resilience, but should be insufficient to enable the materials of the layers to melt, flow, or to char or otherwise adversely affect the finish layer 4. The temperature to which the blank is heated thus may vary in accordance with the materials from which the blank is composed, but if the layer 2 is formed of foamed polystyrene, the layer 3 is composed of foamed polyurethane, and the layer 4 is composed of nylon, satisfactory results may be obtained by heating the blank to a temperature of about 230° F.

Following heating of the blank 36 it is introduced between the separated mold halves 12 and 13. As is indicated in FIGS. 4 and 5, the width of the blank is sufficient to enable it to span the width of the mold halves and, of course, the length of the blank will be sufficient to enable it to span the length of the mold halves.

Promptly after the blank is introduced between the mold halves, and while the temperature of the blank is substantially that to which it was heated, the mold halves are closed so as to enable the die 26 to enter the cavity 17 and deform the blank 36. As the mold halves close, the different inclinations of the surfaces 18 and 27 will result in those portions of the blank therebetween to be subjected to a compressive force greater than elsewhere. The cells of the foamed materials 2 and 3 at these portions of the blank thus will be reduced in size or collapsed so as to provide at the periphery of the blank a wall thickness which tapers from the central portion thereof toward the marginal edge. As the mold halves continue to move toward one another, the die 16 will be displaced downwardly against the bias of the springs 20, but eventually the step 28 will reach the level of the frame members 14. The confronting surfaces of the frame members 14 and of the step 28 are sharp so as to provide cutting edges which will shear the blank as the surface 29 telescopes within the frame members 14 to provide coplanar edges for each layer.

The maximum distance that the mold halves may move toward one another is limited by the stop blocks 33, thereby resulting in an article 1 having a predetermined thickness at its marginal edge.

Following complete closure of the mold halves, the compressive force is maintained and coolant fluid is circulated through the passages 34 and 35 so as to chill the molded article and reduce its temperature to about 100° F. The time required to effect chilling of the molded article depends upon several factors, such as the temperature of the coolant, the number of passages, and the rate of circulation, but suitable chilling can be effected within ten to twenty seconds.

Following chilling of the molded article, the mold halves are separated, whereupon the springs 20 expand and lift the molded article out of the cavity 17 for easy removal.

Since the blank is heated before compression to a temperature level at which the foamed materials lose their resilience, and since the blank is subjected to the compressive force while the temperature of the blank is at such level, the cells of the foamed materials will be collapsed or reduced in size while the foamed materials are tacky. Such reduction is accomplished by expelling air from the cells, such air being exhausted through the vents in the dies. The foamed materials will regain their resilience following cooling, but since the compressive force is maintained during chilling, the compressed materials will not regain their original thickness. As a consequence, the sidewalls of the molded article will have a varying thickness and will taper toward the marginal edge.

The disclosure is representative of presently preferred embodiments of the invention, but is intended to be illustrative rather than definitive thereof. The invention is defined in the claims.

I claim:

1. A method of forming an article from a substantially uniform thickness blank composed of a first layer of resilient or relatively soft, cellular, foamed thermoplastic material laminated to and sandwiched between a second layer of a relatively stiff, cellular, foamed thermoplastic material and a third layer of fabric, said method comprising heating said blank to an elevated temperature sufficiently high to cause said first and second layers of foamed material to become plastic or tacky but insufficient to melt the material of any of said layers or to damage said fabric; deforming said blank while its temperature remains elevated to the shape of the article to be formed; tapering said blank toward its marginal edges and while its temperature remains elevated by compressing the marginal edges of said blank to reduce the size of the cells of both of said first and second layers of foamed material; and cooling said deformed blank.

2. The method according to claim 1 wherein the deforming and tapering of said blank occur simultaneously.

3. The method according to claim 1 including trimming said deformed and tapered blank.

4. The method according to claim 2 wherein the deforming, tapering, and trimming of said blank occur substantially simultaneously.

5. The method according to claim 1 including maintaining said compressive force during cooling of said blank.

6. The method according to claim 1 including tapering said first and second layers of foamed material linearly inwardly from the marginal edges of said blank.

7. The method according to claim 1 wherein said first and second layers of foamed material have different densities.

8. The method according to claim 7 wherein said second layer of foamed material is the denser.

* * * * *